June 10, 1958

C. T. BREWER 2,837,981

METHOD OF TRUNCATING CONICAL CUPS

Filed July 7, 1954

INVENTOR
CLARENCE T. BREWER
BY
Luther W. Hawley
ATTORNEY

June 10, 1958  C. T. BREWER  2,837,981
METHOD OF TRUNCATING CONICAL CUPS
Filed July 7, 1954  6 Sheets-Sheet 2

INVENTOR.
CLARENCE T. BREWER
BY
Luther W. Hawley
ATTORNEY

June 10, 1958 C. T. BREWER 2,837,981
METHOD OF TRUNCATING CONICAL CUPS
Filed July 7, 1954 6 Sheets-Sheet 3
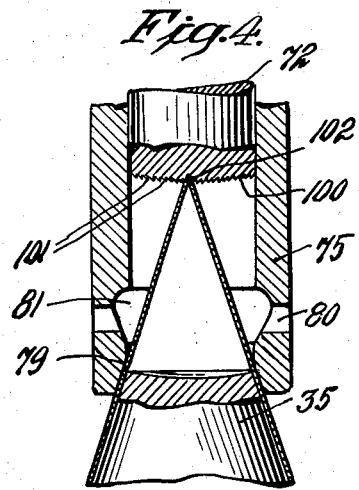
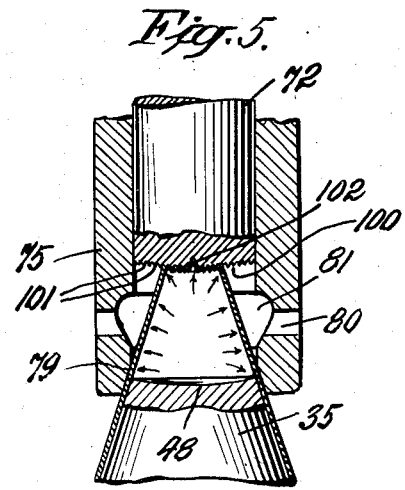
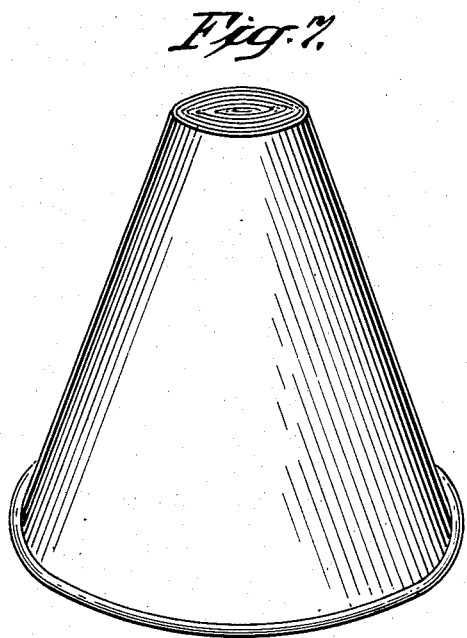
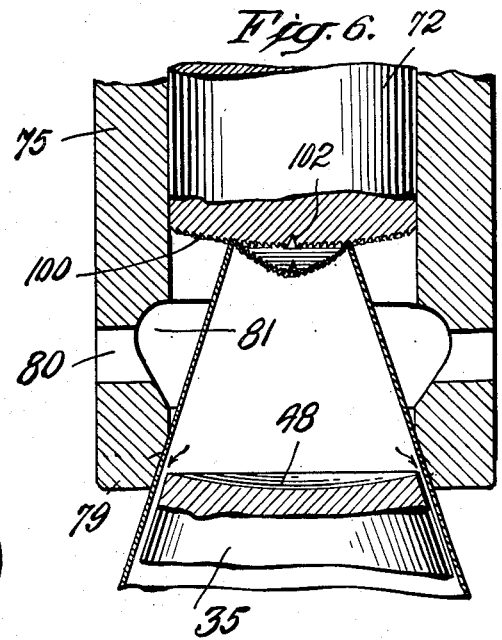
INVENTOR.
CLARENCE T. BREWER
BY
ATTORNEY June 10, 1958
C. T. BREWER
2,837,981
METHOD OF TRUNCATING CONICAL CUPS
Filed July 7, 1954
6 Sheets-Sheet 4
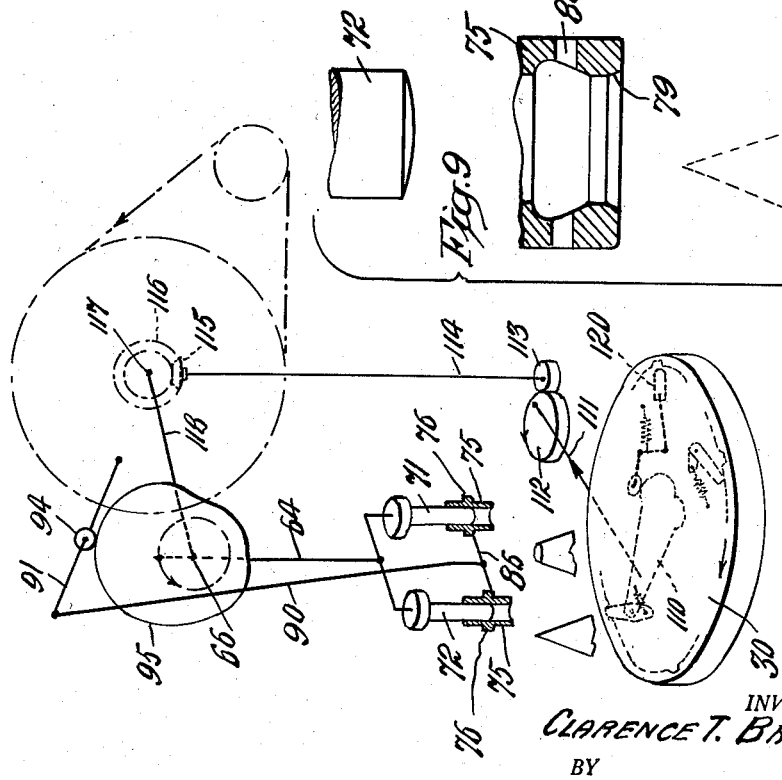
INVENTOR.
CLARENCE T. BREWER
BY
Luther W Hawley
ATTORNEY June 10, 1958　　C. T. BREWER　　2,837,981
METHOD OF TRUNCATING CONICAL CUPS
Filed July 7, 1954　　6 Sheets-Sheet 5
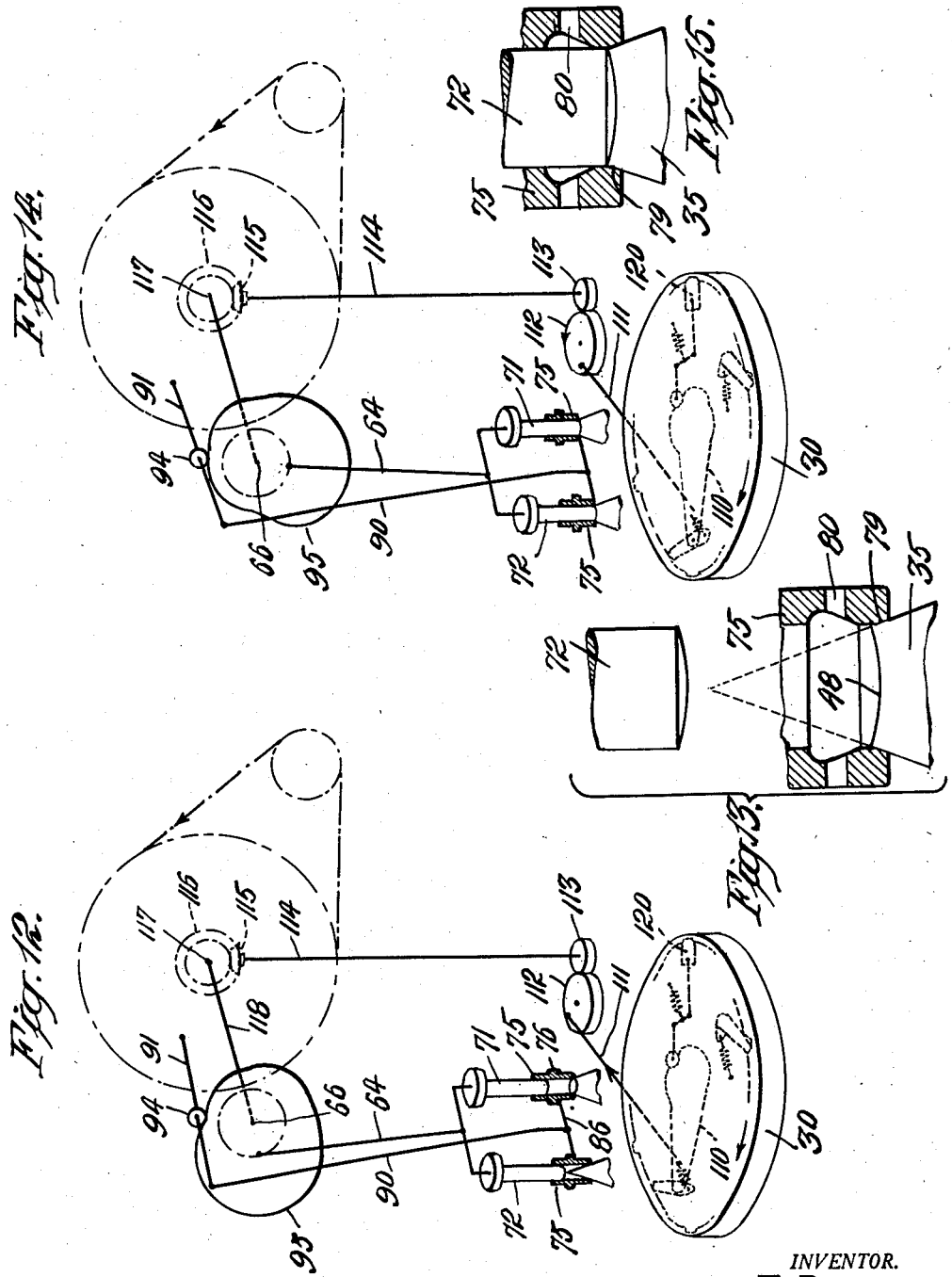
INVENTOR.
CLARENCE T. BREWER
BY
ATTORNEY

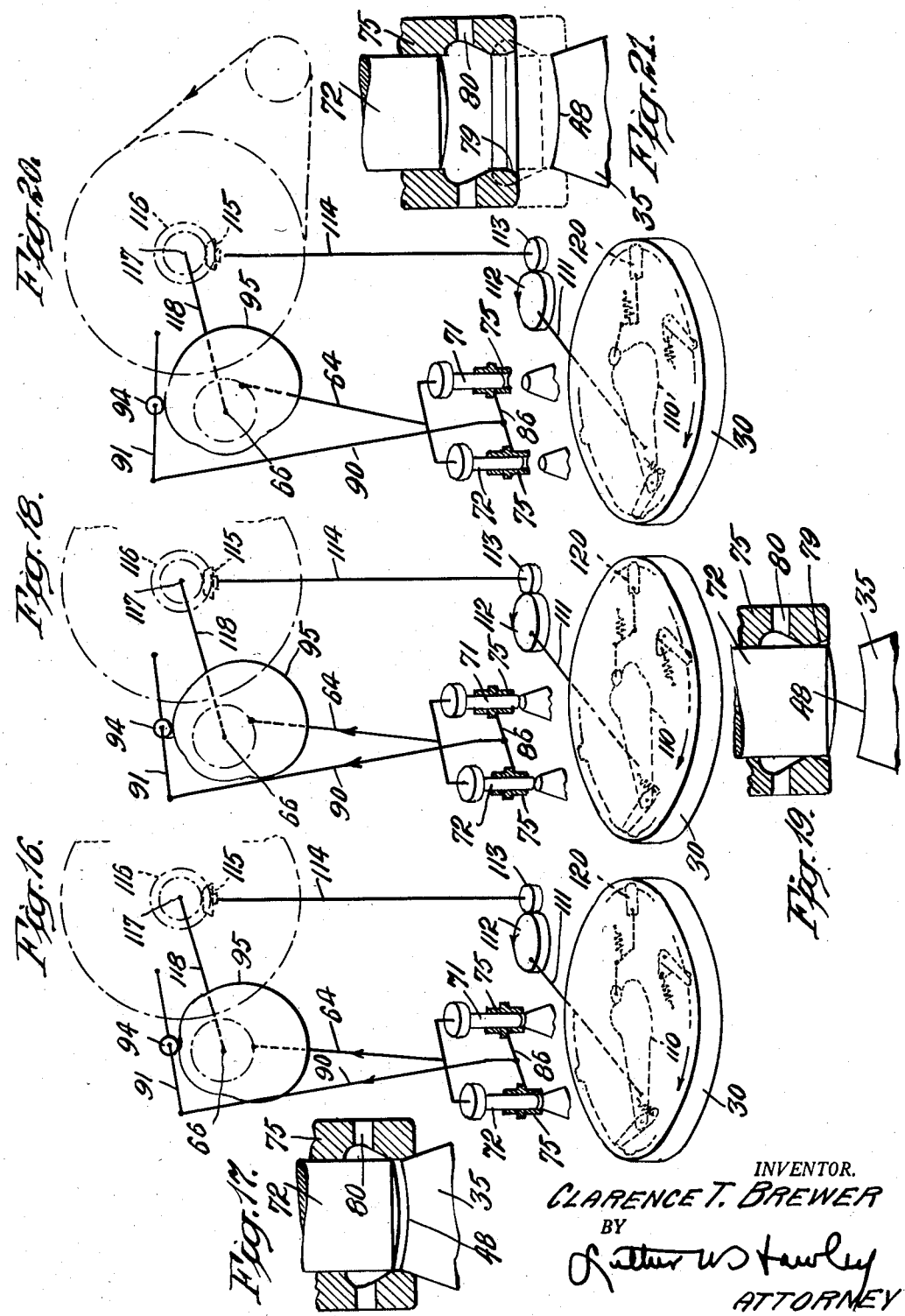

United States Patent Office 2,837,981
Patented June 10, 1958

2,837,981

METHOD OF TRUNCATING CONICAL CUPS

Clarence T. Brewer, Oak Park, Ill., assignor, by mesne assignments, to American Can Company, New York, N. Y., a corporation of New Jersey Application July 7, 1954, Serial No. 441,822

4 Claims. (Cl. 93—36.1)

This invention relates to a method of truncating conical cups.

Such cups, as commonly manufactured and used, have sharp pointed ends. Attempts have been made to blunt or round the ends but such blunted or rounded ends have not been entirely satisfactory since the compressed ends or folds or creases therein are uneven and, furthermore, tend to sag and open up and leak due to the weight of the liquid. To overcome this tendency, cup holders have been provided with bottom supports.

Various methods have been developed for this purpose but they have not been entirely satisfactory nor have they produced a bottom with even folds that is neat in appearance or has uniform strength, nor have they produced a bottom that is self-supporting. Moreover, certain methods require the use of apparatus that is complicated in construction and operation, such as telescoping tubes or sleeves, and such apparatus tends to form irregular or non-uniform creases or folds which tend to crack.

This invention has for its salient object to provide a simple and practical method of truncating the apexes of conical cups in such a manner as to form a self-supporting bottom having uniform strength throughout the truncated area.

Another object of the invention is to provide a method of truncating the bottom of a conical cup in such a manner that the cup bottom will be strong and will not sag under pressure of the liquid therein.

Another object of the invention is to provide a method of truncating the bottoms of conical cups, so worked out that uniform folds or pleats will be formed therein.

Another object of the invention is to provide a method of blunting or tuncating the apexes of conical cups, so constructed and so worked out that the cup wall is positively circumferentially supported and controlled during the pleating or folding operation so that regular circumferential pleats or folds will be formed therein.

Another object of the invention is to provide a method of blunting or truncating the apexes of conical cups, so constructed and so worked out that the cup wall will be uniformly folded and held in circumferential control during the folding and compressing operation.

Further objects of the invention will appear from the following specification taken in connection with the drawings which form a part of this application, and in which Fig. 1 is an elevational view, partly in section, illustrating one form of truncating mechanism adapted for use in carrying out the method;

Fig. 4 is a fragmentary sectional view showing the upper end portion of the anvil, a conical cup thereon, the clamping sleeve clamping the cup to the anvil, and the punch engaging the apex of the cup;

Fig. 5 illustrates the action which takes place when the punch descends in its truncating operation, showing how the air is trapped in the apex;

Fig. 6 is a view similar to Figs. 4 and 5 but illustrating what takes place when the air in the apex is permitted to escape freely;

Fig. 7 is a prospective elevation of a cup truncated by the method embodying the invention;

Figure 1:
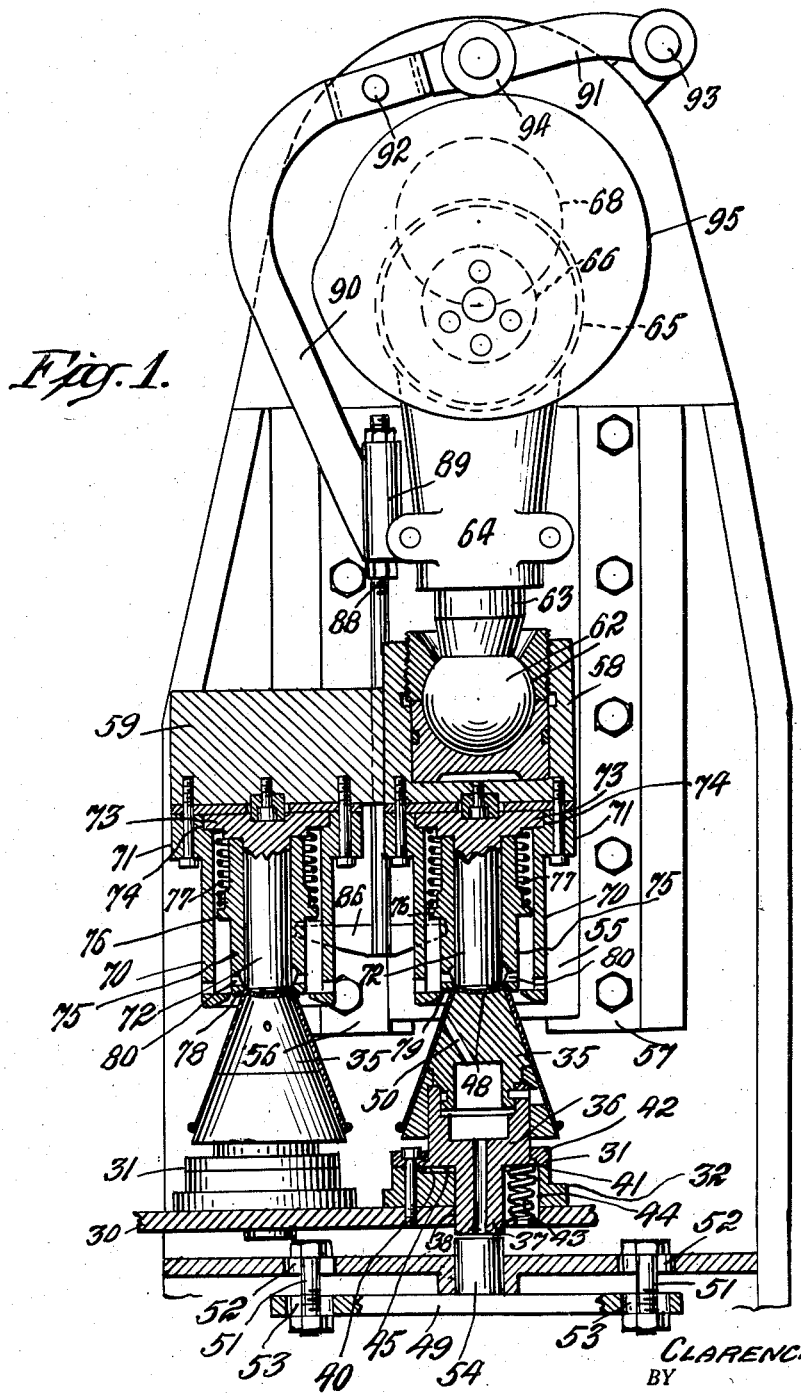

Figs. 8, 10, 12, 14, 16, 18 and 20 are diagrammatic views illustrating the successive positions taken by the clamping sleeves and punches during the carrying out of the method of truncating conical cups in accordance with the invention; and Figs. 9, 11, 13, 15, 17, 19 and 21 are fragmentary sectional elevations illustrating the positions of the punch and clamping ring corresponding to the diagrammatic showings in Figs. 8, 10, 12, 14, 16, 18 and 20.

Although one particular form of apparatus has been illustrated and will be described, it should be understood that the method may be carried out on other mechanism or apparatus and is not limited to the use of the particular apparatus shown.

In the particular apparatus or machine illustrated in the drawings, there is shown a turret table 30 having a plurality of cup supports 31 mounted radially thereon at stations designated A, B, C, D, E and F. The turret is rotated progressively intermittently, one station at a time, to dispose the cup supports in the various stations. At station A the conical cups are received from the cup machine. Station B is idle. At stations C and D the blunting or truncating operation is performed. At station D the second stage of the blunting or finishing operation is performed. Station E is idle. At station F the blunted cups are ejected from the machine.

The cup support consists of an anvil 35 which is mounted on a cylindrical support 36 having a reduced extension 37 vertically movable in an opening 38 in the turret table 30. The support 36 has an annuar outwardly extending flange 40, which in conjunction with a flange 41 on the upper end of a housing 42, limits the upward movement of the support and anvil under the action of springs 43 mounted in the housing 32 and seated at one end in recesses 44 in the turret table and at the other end against a surface 45 of the support 36. The springs 43 provide sufficient reaction pressure for the anvil at the preforming stage of the truncating operation, at station C, but at the finishing station much heavier pressure is used, necessitating a further spring take up.

To take care of the added pressure a deflection bolster or bar 49 is supported beneath a bed plate or base anvil 47, by bolts 51 which extend through slots 52 in the bed plate and slots 53 in the bar 49. A stud 54 rests on the bar 49 and is engageable by the lower end of anvil part 37. By adjusting the bolts 51 in the slots, the effective length of the bar can be adjusted.

The anvil 35 has its upper surface 48 so formed as to give the desired shape to the blunted bottom of the cup and in the form of the invention shown this surface is concave, although it may be convex, if desired. The anvils 35 have air conduits or passages 50 through which a vacuum is applied to hold the cup from spinning when received at station A, and air is blown to eject the finished truncated cups from the turret at station F.

The conical cups are fed to the station A from the cup machine, in which station the cup is mounted on the anvil disposed at the station. Thereafter, a punch is lowered from a position above the apex of the cup and first engages the apex and thereafter successively engages the cup wall to fold the cup inwardly and downwardly, forming corrugations which are finally compacted against the upper surface of the anvil. This is accomplished in the following manner.

The truncating or blunting operation may be carried out in two stages, depending on the finish desired, and is performed, when carried out in two stages, at stations C and D. Above these stations there is mounted a punch housing comprising a vertically movable cross head 55 which operates in vertical guide members 56 and 57 which form a dovetail slide. The cross head 55 has incorporated therewith a platen 58, to which is secured a supplementary platen 59. The cross head 55 and platen 58 are operated by a ball and socket connection 62 to an adjustable pitman 63. A sleeve 64 is adjustably connected to and forms a part of the pitman and on the upper end of the sleeve there is formed a hub 65 which is mounted on a crank pin 66. The crank pin 66 is carried by a crank mounted on a shaft 68. As the shaft is rotated, the crank will rotate about the axis of the shaft and the pitman will oscillate and move vertically to reciprocate the cross head 55.

Since the punches which perform the first and second blunting and finishing operations are operated in exactly the same manner and simultaneously at stages C and D, the vertical movement of the cross head 55 and platens 58 and 59 which carry the punches are identical. These platens also carry the clamps for clamping the cups to the anvil during the truncating and finishing operations.

As shown in Fig. 1, each of the platens 58 and 59 has bolted thereto a downwardly extending cylindrical shoe or casing 70, each casing having a flange 71 bolted to the housing. There is disposed within each shoe, a punch 72 having a flange 73 disposed in a recess 74 in the base of the flange 71. There is mounted in each shoe 70 a sleeve 75 having intermediate its ends an outwardly extending flange 76 which is normally forced downwardly by a spring 77 housed in the shoe 70. The lower end of the sleeve 75 extends through an annular opening 78 in the bottom of the shoe 70 and the extending portion has at its lower end an inner conical surface 79 adapted to seat against the outer surface of the cup wall and clamp the cup to the anvil 35. Lateral openings 80 are formed in the sleeve above the lower end thereof and the inner surface of the sleeve above the openings 80 is preferably grooved so that the air surrounding the portion of the apex of the cup to be truncated or blunted will be venter and permitted to escape through the openings 80.

The vertical movement of the punches 72 is positively controlled by the crank actuated pitman movement but the vertical movement of the clamping sleeves is so controlled that the sleeves will move downwardly and clamp the cup before the punches engage the apex thereof and will be released from their clamping position and be moved upwardly within the casing 70 to a sufficient extent to permit the apex of the cup previously deposited on the support in station A to move beneath the clamping sleeve. The movement and control of the clamping sleeves will now be described.

Figure 2:
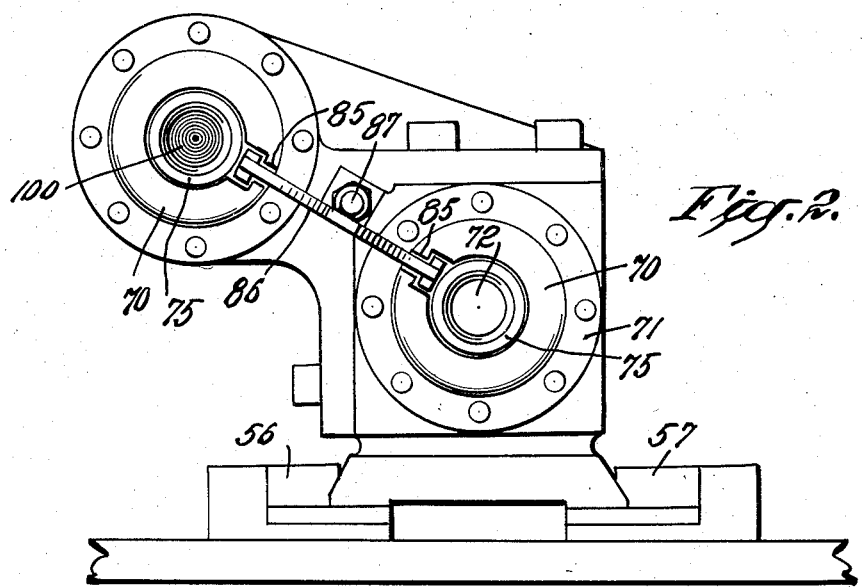
Fig. 2 is a bottom plan view of a portion of the mechanism shown in Fig. 1.
Figure 3:
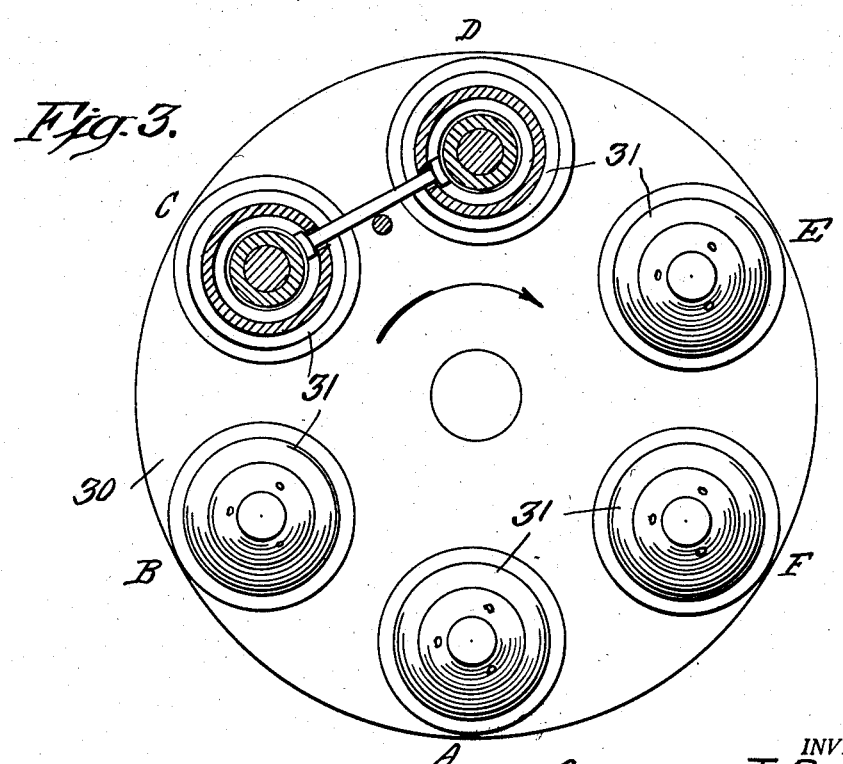
Fig. 3 is a plan view of the turret and cup supports or anvil and also illustrates, in section, the clamping sleeve control and a portion of the operating mechanism therefor.

As shown in Fig. 2, the walls of the shoes 70 which house the clamping sleeves and punches are slotted, as indicated at 85, to receive the ends of a cross arm or bar 86 mounted on the lower end of a rod 87. The upper end of this rod is threaded, as shown at 88 in Fig. 1, and has adjustably mounted thereon a sleeve 89, which is welded or fixedly secured to the lower end of a link 90. The upper end of the link 90 is connected to a lever 91 by a link pin 92, the lever 91 being mounted on a fixed fulcrum or pivot 93. A follower or roller 94 is mounted on the lever intermediate its ends and engages the periphery of a cam 95 which is mounted on the crank pin 66. The outer ends of the bar 86 are disposed beneath the flanges 76 on the clamp sleeve 75 and control the vertical movement of the sleeve under the action of the springs 77. Figs. 8 to 20 inclusive show diagrammatically successive positions in the vertical movement of the clamping sleeve and also of the punch. When the pitman 63 lowers the platen 58 and the connected platen 59, the sleeves 75 will move downwardly with the shoes 70 and the punches 72. However, the sleeves will be permitted by the cam action and the control bar 86 to move into clamping position and clamp the cup on the mandrel or anvil support. Thereafter, the housings and punches carried thereby will continue to move downwardly, causing the springs to hold the clamp tightly around the cup wall. The springs are so gauged or so proportioned that the cup will be tightly held on the anvil, trapping air in the apex above the top of the anvil or the surface 48 thereof. However, the clamp will control the pressure and permit escape of the air in the apex under the desired pressure as the apex is forced downwardly to truncate the cup bottom. This trapping of the air and the escape thereof under pressure is important during the blunting operation since the successive folds which are formed in the cup walls will be ballooned out or will be prevented from collapsing during the blunting operation, to form corrugations substantially parallel to the cup axis.

Figs. 4 to 6 inclusive show the bottom 100 of the punch 72 as serrated or having teeth 101 and also as having a centrally located, upwardly extending V-shaped opening 102.

Although it is not necessary to the successful carrying out of the method that the bottom of the punch be serrated or provided with teeth, it is essential that the bottom of the punch be provided with the V-shaped central opening 102. Where the teeth 100 are used, the pitch of the teeth is determined by the thickness of the apex portion of the cup and this portion is preferably of uniform thickness, best results having been obtained by forming the apex with a uniform double thickness wall.

As the punch descends during the truncating operation, the apex of the cup is first engaged in the V-shaped opening 102 after the cup wall has been firmly clamped to the anvil by the clamping sleeve 75. This clamping action, as shown in Fig. 5, traps the air within the apex of the cup and holds the apex against the bottom of the punch as the punch descends, thus positively circumferentially controlling the apex during the truncating operation. The speed of descent of the punch and the tightness of the clamping action are so regulated that the air in the apex is permitted to escape under pressure as the punch descends. However, the air must not be permitted to escape in the manner illustrated in Fig. 6 since this prevents the apex from being held in contact with the bottom of the punch during the truncating operation. As the apex of the cup is depressed, the air surrounding the apex is permitted to escape and is vented through openings 80 and grooves 81. However, as above stated, the air within the apex is trapped and the apex will be prevented from lateral movement during the truncating thereof.

The anvil upper surface 48 in both stations C and D is complementary in shape to the shape of the bottom of the punch and is preferably concave or spherical. At station D the lower end of the punch is smooth and convex and substantially spherical.

In order to accomplish successfully the blunting or truncating operation, the punch and clamping sleeve must be so controlled during the cycle of operation that the clamping sleeve will clamp the cup prior to the engagement of the punch with the apex, to maintain the clamping action during the truncating operation, hold the truncated cup in the clamp as the punch is elevated to strip the cup from the punch and thereafter accelerate the upward movement of the clamp to cause the punch to eject the cup from the clamp.

These movements are accomplished by the crank and pitman operation of the punches and the cam control of the clamping sleeves.

In carrying out the truncating operations, it is essential that the punches and clamping sleeves be initially elevated to a sufficient extent to permit the turret table 30 to rotate or be indexed to properly position the anvils beneath the clamping sleeves and punches. Fig. 8 illustrates diagrammatically this position in which the punches 72 and clamping sleeves 75 are disposed in their extreme upper position to permit the turret table 30 to index in the manner described. Fig. 9 shows the punch 72 and clamping sleeve 75 in the position of operation illustrated in Fig. 8, namely, the position in which the cup and anvil on which it is mounted are moving to a position beneath the punch 72 and sleeve 75.

Fig. 8 also illustrates diagrammatically one form of means for indexing the turret table. In this form of construction, an arm 110 is pivoted beneath the turret table and is actuated by a link 111 connected to a crank gear 112, which in turn is geared at 113 to a shaft 114 geared at 115 and 116 to a shaft 117 which drives a shaft 118, the shaft 118 being connected to drive the shaft 66. The turret table is held in its indexed stations by a locking latch 120 during the retraction of the indexing pawl 121 pivoted to arm 110. The locking latch 120 is released when the indexing panel starts its indexing movement. Since the turret operating mechanism and particular driving connections do not constitute a part of the invention claimed in this application, they are shown merely diagrammatically and need not be illustrated or explained in detail. It will be understood that for each turret station there will be provided a notch for the indexing pawl and for the locking latch.

In Fig. 10 the turret table has been indexed and the anvils have moved to a position beneath the clamping sleeves and punches and the punches and sleeve have begun their downward movement. Fig. 11 is a view similar to Fig. 9 and illustrating the punch 72 and clamping sleeve 75 in the positions taken in Fig. 10.

Fig. 12 shows the clamps 75 in clamping position before the punch 72 reaches the apex of the cup. This is illustrated also in Fig. 13.

In Figs. 14 and 15 the clamps and punches are shown in their extreme lower position, in which position the truncating of the apex has been completed.

In Figs. 16 and 17 the clamps 75 are still disposed in their lowermost positions but the punches have started to move upwardly. The clamps therefore hold the cups and strip the cup bottoms from the rising punches.

In Figs. 18 and 19 the accelerated rising movements of the clamping sleeves cause the punches to eject the cup from the clamp.

In Figs. 20 and 21 the clamps and punches have been elevated to a position to clear the anvils before the turret again starts to index.

From the foregoing specification it will be evident that the method outlined will effect the truncation of the apex of a conical cup in such a manner that the apex will be circumferentially controlled during the truncating operation and will be held in axial alinement with the axis of the anvil and punch and against lateral deviation therefrom during the truncating operation, thus resulting in substantially uniform circumferential folds.

Moreover, the method is carried out in such a manner as to permit indexing of the anvil support, truncation of the cup apexes, release of the punch bottoms from the truncated cup bottoms, and release of the cups from the clamps.

Although one specific embodiment of the method has been particularly described, no limitations are intended other than those imposed by the appended claims.

What I claim is:

1. A method of truncating the apex of a conical cup which consists of clamping the apex portion of the cup on a solid one-piece, truncated anvil and of scoring and folding successive annular wall portions, starting at the apex, against the pressure of air in the apex, so regulating the rate of depression of the apex and the tightness of the clamping action on the cup wall as to permit the slow escape of the air trapped in the apex and venting the air outside the portion being compressed during the truncating operation.

2. A method of truncating the apex of a conical cup which consists of clamping the apex portion of the cup on a solid one-piece, truncated anvil and of scoring and folding successive annular wall portions, starting at the apex, against the pressure of air in the apex, venting the air outside the portion being compressed during the truncating operation, and providing for the controlled escape of air under pressure from inside the apex during the compression of the apex.

3. A method of truncating the apex of a conical cup which consists of clamping the apex end portion of the cup on a one-piece, truncated anvil with the apex projecting beyond the anvil, compressing the apex from the point toward the mouth of the cup against the pressure of air in the apex, so regulating the rate of depression of the apex and the tightness of the clamping action on the cup wall as to permit the slow escape of the air trapped in the apex, and venting the air outside the projecting portion being compressed during the truncating operation.

4. A method of truncating the apex of a conical cup which consists of compressing the apex between a punch and an anvil while clamping the apex end portion of the cup to a one-piece, truncated anvil, clamping the cup before the punch engages the apex, thereby trapping air in the apex, controlling the venting of the air from the apex to permit the slow escape of air from the apex as the punch descends and raising the punch from its position of maximum compression before releasing the clamp from the cup wall.

References Cited in the file of this patent

UNITED STATES PATENTS

| | | |
|---|---|---|
| 1,257,949 | Adelson | Feb. 26, 1918 |
| 2,104,535 | Barbieri | Jan. 4, 1938 |
| 2,220,312 | Barbieri | Nov. 5, 1940 |
| 2,563,632 | Amberg | Aug. 7, 1951 |